United States Patent
Shabbir et al.

(10) Patent No.: US 9,250,649 B2
(45) Date of Patent: Feb. 2, 2016

(54) DISPLAYING RECOMMENDED PLACEMENT OF INFORMATION HANDLING SYSTEMS BASED ON IMPEDANCE RANKING

(71) Applicant: Dell Products L.P., Round Rock, TX (US)

(72) Inventors: Hasnain Shabbir, Round Rock, TX (US); Ramsundar Govindarajan, Round Rock, TX (US); Dinesh Kunnathur Ragupathi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 14/041,152

(22) Filed: Sep. 30, 2013

(65) Prior Publication Data

US 2015/0095270 A1    Apr. 2, 2015

(51) Int. Cl.
- *G06F 17/00* (2006.01)
- *G06F 1/16* (2006.01)
- *G06Q 10/00* (2012.01)
- *G06F 17/50* (2006.01)

(52) U.S. Cl.
CPC ............... *G06F 1/16* (2013.01); *G06F 17/509* (2013.01); *G06F 17/5086* (2013.01); *G06Q 10/00* (2013.01); *G06F 2217/02* (2013.01); *G06F 2217/80* (2013.01)

(58) Field of Classification Search
CPC .................................. G06F 1/206; G06F 1/20
USPC ............................ 361/679.46; 706/12, 45, 62
See application file for complete search history.

(56) References Cited

U.S. PATENT DOCUMENTS

| | | | |
|---|---|---|---|
| 6,289,405 B1* | 9/2001 | Movall et al. | 710/104 |
| 6,418,492 B1* | 7/2002 | Papa et al. | 710/302 |
| 6,639,794 B2* | 10/2003 | Olarig et al. | 361/679.48 |
| 8,208,253 B1* | 6/2012 | Goergen et al. | H05K 7/1445 342/175 |
| 8,345,439 B1* | 1/2013 | Goergen et al. | H05K 7/1458 361/788 |
| 2002/0062454 A1* | 5/2002 | Fung | 713/300 |
| 2008/0126630 A1* | 5/2008 | Farkas et al. | 710/69 |
| 2010/0046182 A1* | 2/2010 | Jia | H05K 3/222 361/760 |
| 2011/0133944 A1* | 6/2011 | Homer et al. | G06F 1/206 340/635 |
| 2014/0231503 A1* | 8/2014 | Arimura | H01Q 13/10 235/375 |

* cited by examiner

*Primary Examiner* — David Vincent
(74) *Attorney, Agent, or Firm* — Jackson Walker L.L.P.

(57) ABSTRACT

In accordance with embodiments of the present disclosure, a system may comprise a plurality of slots each configured to receive a modular information handling system, a plurality of air movers each configured to cool at least one modular information handling system disposed in at least one of the plurality slots, and a chassis management controller communicatively coupled to the plurality of slots and the plurality of air movers and configured to display a recommended placement of modular information handling systems in the plurality of slots based on at least one of: identities of slots populated with modular information handling systems, an airflow ranking of the plurality of slots, an impedance ranking of information handling systems disposed in the slots, and a workload of each of the information handling systems disposed in the slots.

20 Claims, 2 Drawing Sheets

| ZONE | SLOTS | AIR MOVERS |
|------|-------|------------|
| 1 | h, p | c, f, i |
| 2 | e, f, g, m, n, o | b, c, e, f, h, i |
| 3 | b, c, d, j, k, l | a, b, d, e, g, h |
| 4 | a, i | a, d, g |

DISPLAYING RECOMMENDED PLACEMENT OF INFORMATION HANDLING SYSTEMS BASED ON IMPEDANCE RANKING

TECHNICAL FIELD

The present disclosure relates in general to information handling systems, and more particularly to determining an optimum location for an information handling system within a modular chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Information handling systems may often be employed in servers, including server architectures with multiple information handling systems with various peripheral and input/output (I/O) capabilities common to the chassis. Implementation of such a server chassis with slots for multiple information handling systems may present challenges, including populating the chassis with information handling systems in a manner that provides the necessary cooling by air movers, while reducing the amount of power consumed by the air movers.

SUMMARY

In accordance with the teachings of the present disclosure, disadvantages and problems associated with slot configuration of an information handling system server chassis may be reduced or eliminated.

In accordance with embodiments of the present disclosure, a system may comprise a plurality of slots each configured to receive a modular information handling system, a plurality of air movers each configured to cool at least one modular information handling system disposed in at least one of the plurality slots, and a chassis management controller communicatively coupled to the plurality of slots and the plurality of air movers and configured to display a recommended placement of modular information handling systems in the plurality of slots based on at least one of: identities of slots populated with modular information handling systems, an airflow ranking of the plurality of slots, an impedance ranking of information handling systems disposed in the slots, and a workload of each of the information handling systems disposed in the slots.

In accordance with these and other embodiments of the present disclosure, a method may include receiving information regarding at least one of: identities of slots populated with modular information handling systems, an airflow ranking of the plurality of slots, an impedance ranking of information handling systems disposed in the slots, and a workload of each of the information handling systems disposed in the slots. The method may further include displaying a recommended placement of modular information handling systems in the plurality of slots based on the received information.

In accordance with these and other embodiments of the present disclosure, an article of manufacture may include a non-transitory computer-readable medium and computer-executable instructions carried on the computer readable medium, wherein the instructions are readable by a processor. The instructions, when read and executed, may cause the processor to receive information regarding at least one of: identities of slots populated with modular information handling systems, an airflow ranking of the plurality of slots, an impedance ranking of information handling systems disposed in the slots, and a workload of each of the information handling systems disposed in the slots, and a workload of each of the information handling systems disposed in the slots; and display a recommended placement of modular information handling systems in the plurality of slots based on the received information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
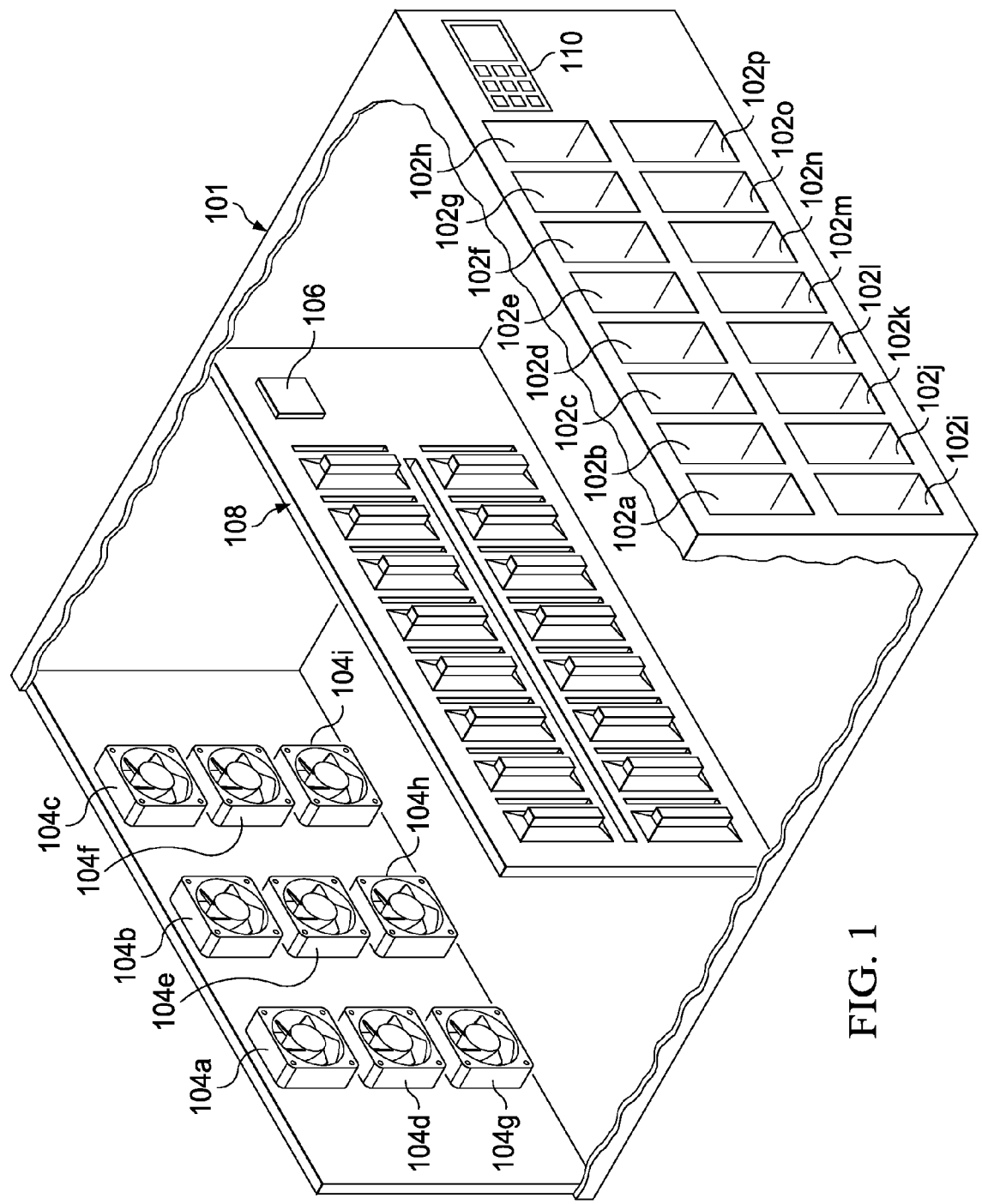
FIG. 1 illustrates a block diagram of an example system chassis configured to receive multiple modular information handling systems, in accordance with embodiments of the present disclosure.
Figures 2, 3:
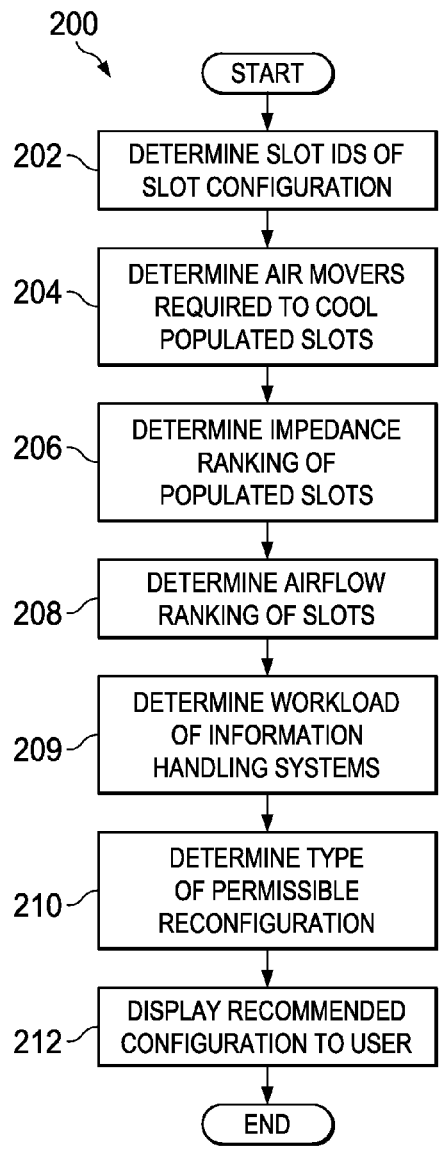
FIG. 2 illustrates a flow chart of an example method for recommending an information handling system slot configuration, in accordance with the present disclosure.
FIG. 3 illustrates an example table defining zones whereby particular air movers within the chassis depicted in FIG. 1 are associated with particular slots within chassis, in accordance with the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example system having a chassis 101 with a plurality of slots 102a-p (sometimes referred to individually as a slot 102 or in plural as slots 102) electrically and mechanically coupled to a midplane 108, wherein each slot 102 may be configured to receive a modular information handling system (e.g., a server). Although FIG. 1 depicts chassis 101 as having 16 slots 102, chassis 101 may include any suitable number of slots 102. As depicted in FIG. 1, chassis 101 may also include a chassis management controller (CMC) 106 electrically and mechanically coupled to midplane 108, a plurality of air movers 104a-104i (sometimes referred to individually as an air mover 104 or in plural as air movers 104) communicatively coupled to CMC 106, and a user interface 110 communicatively coupled to CMC 106.

An air mover 104 may be communicatively coupled to CMC 106, and may include any mechanical or electro-mechanical system, apparatus, or device operable to move air and/or other gasses. In some embodiments, an air mover 104 may comprise a fan (e.g., a rotating arrangement of vanes or blades which act on the air). In other embodiments, an air mover 104 may comprise a blower (e.g., a centrifugal fan that employs rotating impellers to accelerate air received at its intake and change the direction of the airflow). In these and other embodiments, rotating and other moving components of an air mover 104 may be driven by a motor. The rotational speed of such motor may be controlled by one or more control signals communicated from CMC 106. In operation, an air mover 104 may cool information handling systems and information handling resources of chassis 101 by drawing cool air into chassis 101 from outside chassis 101, expel warm air from inside chassis 101 to the outside of chassis, and/or move air across one or more heatsinks (not explicitly shown) internal to chassis 101 to cool one or more information handling systems and/or information handling resources. Although FIG. 1 depicts chassis 101 as having nine air movers 104, chassis 101 may include any suitable number of air movers 104.

CMC 106 may comprise any system, device, or apparatus configured to facilitate management and/or control of components of chassis 101, information handling systems modularly coupled within, and/or one or more of its component information handling resources. CMC 106 may be configured to issue commands and/or other signals to manage and/or control information handling systems coupled to slots 102 and/or information handling resources of chassis 101. CMC 106 may comprise a microprocessor, microcontroller, DSP, ASIC, field programmable gate array ("FPGA"), EEPROM, or any combination thereof. As shown in FIG. 1, CMC 106 may be coupled to midplane 108.

In addition or alternatively, CMC 106 may also provide a management console for user/administrator access to these functions. For example, CMC 106 may provide for communication with a user interface (e.g., user interface 110), permitting a user to interact with CMC 106 and configure control and management of components of chassis 101 by CMC 106. As another example, CMC 106 may implement Web Services Management ("WS-MAN") or another suitable management protocol permitting a user to remotely access a CMC 106 to configure chassis 101 and its various information handling resources. In such embodiments, a CMC 106 may interface with a network interface separate from a traditional network interface of chassis 101, thus allowing for "out-of-band" control of chassis 101, such that communications to and from CMC 106 are communicated via a management channel physically isolated from an "in band" communication channel with the traditional network interface. Thus, for example, if a failure occurs in chassis 101 that prevents an administrator from interfacing with chassis 101 via a traditional network interface and/or user interface 110 (e.g., operating system failure, power failure, etc.), the administrator may still be able to monitor and/or manage chassis 101 (e.g., to diagnose problems that may have caused failure) via CMC 106. In the same or alternative embodiments, CMC 106 may allow an administrator to remotely manage one or more parameters associated with operation of chassis 101 and its various information handling resources (e.g., power usage, processor allocation, memory allocation, security privileges, etc.).

Midplane 108 may comprise any system, device, or apparatus configured to interconnect information handling resources of chassis 101 with each other. Accordingly, midplane 108 may include slots, pads, and/or other connectors configured to receive corresponding electrical connectors of information handling resources in order to electrically couple information handling systems disposed in slots 102 and/or information handling resources to each other.

User interface 110 may include any system, apparatus, or device via which a user may interact with chassis 101 and its various components by facilitating input from a user allowing the user to manipulate chassis 101 and output to a user allowing chassis 101 to indicate effects of the user's manipulation. For example, user interface 110 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 110 may include other user interface elements (e.g., a keypad, buttons, and/or switches placed in proximity to a display) allowing a user to provide input to chassis 101. User interface 110 may be coupled to CMC 106 and/or other components of chassis 101, and thus may allow a user to configure various information handling systems and/or information handling resources of chassis 101.

In addition to slots 102, air movers 104, CMC 106, midplane 108, and use interface 110, chassis 101 may include one or more other information handling resources.

In operation, CMC 106 may, based on identities of slots 102 populated with information handling systems and one or more characteristics of individual information handling systems populating the slots (e.g., airflow impedance, requested airflow, etc.), determine in real-time a power-efficient optimum configuration of information handling systems within various slots 102, as described in greater detail in FIG. 2 below.

FIG. 2 illustrates a flow chart of an example method 200 for recommending, in real-time, an information handling system slot configuration, in accordance with the present disclosure. According to one embodiment, method 200 may begin at step 202. As noted above, teachings of the present disclosure may be implemented in a variety of configurations of chassis 101. As such, the preferred initialization point for method 200 and the order of the steps comprising method 200 may depend on the implementation chosen.

At step 202, CMC 106 may determine the identities of slots 102 populated with information handling systems 102. At step 204, CMC 106 may determine which air movers 104 are required to cool information handling systems in the populated slots. In some embodiments, CMC 106 may maintain a table, database, map, list, or other data structure which associates particular slots 102 to corresponding air movers 104. An example of such data structure is set forth in FIG. 3, in which various zones of slots 102 are defined, and the air movers 104 required to cool information handling systems disposed in slots within the various zones are also defined. Thus, if one or more slots 102 in a particular zone are populated, CMC 106 or another component of chassis 101 will cause the air movers assigned to such zone to operate and cool the information handling systems populated in the zone.

At step 206, CMC 106 may determine an impedance ranking of each information handling systems populating a slot 102, such that the higher an impedance ranking for an information handling system, the more airflow the information handling system requires. In some embodiments, such impedance ranking may be determined from reading thermal tables associated with the information handling systems, which may take into account thermal requirements of various information handling resources, including numbers and/or types of processors, memories, storage controller, and/or other information handling resources.

At step 208, CMC 106 may determine an airflow ranking for each of the populated slots 102, wherein the higher the airflow ranking for a slot 102, the greater the airflow to the slot 102. Such airflow ranking of a particular slot 102 may be based on a physical structure of such slot 102, physical characteristics of an information handling system disposed in such slot 102, physical structures of chassis 101 impeding flow of air from air movers 104 to the particular slot (e.g., midplane 108, etc.), and/or other characteristics of chassis 101. In some embodiments, airflow ranking for various slots 102 may be determined based on laboratory testing and characterization of chassis 101 or chasses similar thereto prior to delivery of chassis 101 to an intended end user.

At step 209, CMC 106 may determine the workload of each information handling system populated in a slot 102. Such workload may be indicative of the cooling requirements of an information handling system.

At step 210, CMC 106 may determine a type of permissible reconfiguration of information handling systems, which, in some embodiments, may be based on a user preference. For example, a user may specify that CMC 106 may suggest any permissible reconfiguration of information handling systems within slots 102 of chassis 101 in order to reduce power consumption of air movers 104. As another example, a user may specify that CMC 106 may suggest only a reconfiguration in which a newly-added or to-be-newly-added information handling system is reassigned to another slot.

At step 212, based on some or all of the information collected in steps 202 through 210, CMC 106 may display to a user (e.g., via user interface 110 or another user interface) a recommended configuration for populating slots 102 with information handling systems. After completion of step 212, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using CMC 106 or any other system operable to implement method 200. In certain embodiments, method 200 may be implemented partially or fully in software and/or firmware embodied in computer-readable media.

Method 200 as described above may be applied in at least one of two scenarios. For example, in a first scenario, slots 102 may be populated with a particular configuration of information handling systems, and CMC 106 may provide a recommendation as to how to reconfigure to achieve power savings. As another example, in a second scenario, a user may desire to add another information handling system to chassis 101, and CMC 106 may provide a recommendation of which slot 102 to place the to-be-added information handling system. In such scenario, the user may input information into CMC 106 regarding the information handling system (e.g., type, size, etc.) which may be indicative of the airflow ranking of the to-be-added information handling system, and such information may be used, along with information regarding the already-populated slots 102, to recommend slot placement of the to-be-added information handling system.

To further illustrate functionality of the systems and methods disclosed herein, some examples are provided below.

In a first example, slots 102a and 102h may be populated with information handling systems. Thus, in accordance with the table set forth in FIG. 3, air movers 104a, 104c, 104d, 104f, 104g, and 104i will be powered on to provide cooling. Based on information regarding slots 102 and the information handling systems disposed therein, CMC 106 may recommend that the information handling system in slot 102h be moved to slot 102i, such that only air movers 104a, 104d, and 104g are required, thus saving energy over the present configuration in which six air movers 104 are required.

In a second example, slot 102a may be populated with an information handling system, and a user may desire to add another information handling system. Based on information regarding slots 102 and the information handling systems disposed therein, and information about the information handling system to be added, CMC 106 may recommend that the to-be-added information handling system be added to slot 102i, as addition to 102i requires that no more additional air movers 104 be activated, while an addition to another slot may require additional air movers to be powered on.

In a third example, slots 102a and 102i may be populated with information handling systems. Slot 102a may have a higher airflow ranking than slot 102i, and the information handling system in slot 102i may have a higher airflow impedance and/or greater workload than the information handling system in slot 102a. Based on information regarding slots 102 and the information handling systems disposed therein, CMC 106 may recommend that the information handling system in slots 102a and 102i be swapped, such that the higher impedance/workflow information handling system is placed in the higher airflow slot 102 and the lower impedance/workflow information handling system is placed in the lower airflow slot 102.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a plurality of slots each configured to receive a modular information handling system;
   a plurality of air movers each configured to cool at least one modular information handling system disposed in at least one of the plurality slots; and
   a chassis management controller communicatively coupled to the plurality of slots and the plurality of air movers and configured to display a recommended placement of modular information handling systems in the plurality of slots based on an impedance ranking of information handling systems disposed in the slots.

2. The system of claim 1, wherein the chassis management controller is further configured to display a recommended placement of modular information handling systems in the plurality of slots based on a user-defined preference of permissible reconfiguration of the placement of information handling systems in the slots.

3. The system of claim 1, wherein displaying a recommended placement of modular information handling systems in the plurality of slots comprises displaying a recommended placement of an information handling system to be added to the system.

4. The system of claim 1, wherein:
   the information further comprises an airflow ranking of the plurality of slots; and
   the recommended placement is based on the airflow ranking and the impedance ranking.

5. A method comprising:
   receiving information regarding an impedance ranking of information handling systems disposed in one or more of a plurality of slots each configured to receive a modular information handling system; and
   displaying a recommended placement of modular information handling systems in the plurality of slots based on the received information.

6. The method of claim 5, wherein displaying the recommended placement further comprises displaying the recommended placement based on a user-defined preference of permissible reconfiguration of the placement of information handling systems in the slots.

7. The method of claim 5, wherein displaying a recommended placement of modular information handling systems in the plurality of slots comprises displaying a recommended placement of an information handling system to be added to the chassis.

8. The method of claim 5, wherein:
   the information further comprises an airflow ranking of the plurality of slots; and
   the recommended placement is based on the airflow ranking and the impedance ranking.

9. An article of manufacture comprising:
   a non-transitory computer-readable medium; and
   computer-executable instructions carried on the computer readable medium, the instructions readable by a processor, the instructions, when read and executed, for causing the processor to:
     receive information regarding an impedance ranking of information handling systems disposed in one or more of a plurality of slots each configured to receive a modular information handling system; and
     display a recommended placement of modular information handling systems in the plurality of slots based on the received information.

10. The article of claim 9, wherein displaying the recommended placement further comprises displaying the recommended placement based on a user-defined preference of permissible reconfiguration of the placement of information handling systems in the slots.

11. The article of claim 9, wherein displaying a recommended placement of modular information handling systems in the plurality of slots comprises displaying a recommended placement of an information handling system to be added to the chassis.

12. The article of claim 9, wherein:
   the information further comprises an airflow ranking of the plurality of slots; and
   the recommended placement is based on the airflow ranking and the impedance ranking.

13. The article of claim 9, wherein the information further comprises identities of slots populated with modular information handling systems.

14. The article of claim 9, wherein the information further comprises an airflow ranking of the plurality of slots.

15. The system of claim 1, wherein the information further comprises identities of slots populated with modular information handling systems.

16. The system of claim 1, wherein the information further comprises an airflow ranking of the plurality of slots.

17. The method of claim 5, wherein the information further comprises identities of slots populated with modular information handling systems.

18. The method of claim 5, wherein the information further comprises an airflow ranking of the plurality of slots.

19. The method of claim 5, wherein the information further comprises a workload of each of the information handling systems disposed in the slots.

20. The system of claim 1, wherein the information further comprises a workload of each of the information handling systems disposed in the slots.

\* \* \* \* \*